United States Patent
Beracha et al.

(10) Patent No.: US 12,309,076 B1
(45) Date of Patent: May 20, 2025

(54) LOAD BALANCER FOR PARALLEL LINK NETWORKS USING WEIGHTED ROUND ROBIN SCHEDULING

(71) Applicant: MELLANOX TECHNOLOGIES, LTD., Yokneam (IL)

(72) Inventors: Eran Gil Beracha, Tel Aviv (IL); Tal Mund, Herzelia (IL); Gil Mey-Tal, Hod Hasharon (IL)

(73) Assignee: Mellanox Technologies, Ltd., Yokneam (IL)

( * ) Notice: Subject to any disclaimer, the term of this patent is extended or adjusted under 35 U.S.C. 154(b) by 5 days.

(21) Appl. No.: 18/397,072

(22) Filed: Dec. 27, 2023

(51) Int. Cl.
*H04B 7/02* (2018.01)
*H04L 47/62* (2022.01)
*G06F 13/14* (2006.01)

(52) U.S. Cl.
CPC ........ *H04L 47/623* (2013.01); *H04L 47/6225* (2013.01)

(58) Field of Classification Search
CPC ... H04L 47/623; H04L 47/6225; G06F 13/14; H04B 7/02
USPC .......................................................... 709/238
See application file for complete search history.

(56) References Cited

U.S. PATENT DOCUMENTS

| | | | |
|---|---|---|---|
| 6,178,448 B1 * | 1/2001 | Gray .................... | H04L 47/125 709/224 |
| 2012/0321011 A1 * | 12/2012 | Kohda .................. | H04L 1/0025 375/267 |
| 2015/0280972 A1 * | 10/2015 | Sivan .................. | H04L 41/0668 370/225 |
| 2021/0394579 A1 * | 12/2021 | Jang .................... | B60G 21/055 |

* cited by examiner

*Primary Examiner* — Jude Jean Gilles
(74) *Attorney, Agent, or Firm* — Hogan Lovells US LLP

(57) ABSTRACT

Approaches disclosed herein provide for the use of load balancers to perform tasks such as to queue traffic. In at least one embodiment, a plurality of parallel links queue traffic by, at least in part, representing a weight of the plurality of parallel links as a plurality of bit strings, where the plurality of bit strings are converted to a plurality of sparse bit strings, and where the plurality of sparse bit strings to be used to generate a representative vector of sequentially interleaved bits of the plurality of sparse bit strings. The traffic for the plurality of parallel links can be queued according to the representative vector. The load balancer may be used in a computer network to manage traffic between nodes connected by parallel links.

20 Claims, 12 Drawing Sheets

| Bit index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Weight0 | 0 | 0 | 0 | 0 | 0 | 0 | 0 | 0 | 0 | 0 | 0 | 0 | 0 | 0 | 0 | 0 |
| Weight1 | 0 | 0 | 0 | 0 | 0 | 0 | 0 | 0 | 1 | 0 | 0 | 0 | 0 | 0 | 0 | 0 |
| Weight2 | 1 | 0 | 0 | 0 | 0 | 0 | 0 | 0 | 0 | 0 | 0 | 0 | 0 | 0 | 0 | 0 |
| Weight3 | 1 | 0 | 0 | 0 | 1 | 0 | 0 | 0 | 0 | 0 | 0 | 0 | 0 | 0 | 0 | 0 |
| Weight4 | 1 | 0 | 0 | 0 | 1 | 1 | 0 | 0 | 1 | 0 | 0 | 0 | 1 | 0 | 0 | 0 |
| Weight5 | 1 | 0 | 0 | 0 | 1 | 0 | 0 | 1 | 1 | 0 | 0 | 0 | 1 | 0 | 1 | 1 |
| Weight6 | 1 | 0 | 1 | 0 | 1 | 0 | 1 | 0 | 1 | 0 | 1 | 0 | 1 | 0 | 1 | 0 |
| Weight7 | 1 | 0 | 1 | 1 | 1 | 1 | 1 | 0 | 1 | 0 | 1 | 0 | 1 | 1 | 1 | 1 |
| Weight8 | 1 | 1 | 1 | 0 | 1 | 1 | 1 | 0 | 1 | 0 | 1 | 0 | 1 | 1 | 1 | 0 |
| Weight9 | 1 | 1 | 1 | 0 | 1 | 0 | 1 | 0 | 1 | 1 | 1 | 0 | 1 | 1 | 1 | 0 |
| Weight10 | 1 | 1 | 1 | 0 | 1 | 1 | 1 | 0 | 1 | 1 | 1 | 0 | 1 | 1 | 1 | 0 |
| Weight11 | 1 | 1 | 1 | 0 | 1 | 1 | 1 | 0 | 1 | 1 | 1 | 0 | 1 | 1 | 1 | 1 |
| Weight12 | 1 | 1 | 1 | 1 | 1 | 1 | 1 | 1 | 0 | 1 | 1 | 0 | 1 | 1 | 1 | 0 |
| Weight13 | 1 | 1 | 1 | 0 | 1 | 1 | 1 | 0 | 1 | 1 | 1 | 0 | 1 | 1 | 1 | 1 |
| Weight14 | 1 | 1 | 1 | 1 | 1 | 1 | 1 | 1 | 1 | 1 | 1 | 1 | 1 | 1 | 1 | 0 |
| Weight15 | 1 | 1 | 1 | 1 | 1 | 1 | 1 | 1 | 0 | 1 | 1 | 0 | 1 | 1 | 1 | 1 |
| Weight16 | 1 | 1 | 1 | 1 | 1 | 1 | 1 | 1 | 1 | 1 | 1 | 1 | 1 | 1 | 1 | 1 |

FIG. 3B

LOAD BALANCER FOR PARALLEL LINK NETWORKS USING WEIGHTED ROUND ROBIN SCHEDULING

TECHNICAL FIELD

At least one embodiment pertains to queueing system and particularly to using load balancers to manage traffic within queueing systems.

BACKGROUND

Traffic balancers may be provided for certain networks, such as those with parallel links between nodes, to optimally spread the traffic between queues in order to maximize bandwidth and minimize latency. In an example, network congestion may occur if the traffic is not spread evenly across the queues as a function of time and when non-symmetry occurs in the network, such as link or queue failure. Adaptive routing may be provided in the network communications to maximize network utilization by load balancing traffic based on local switch states such as queue length and port utilization. In a non-symmetrical system, each link may have a different weight representing the capability of forwarding traffic. Additionally, the amount of traffic sent to each port may be a result of local congestion, remote congestion, drops, and more. Therefore, an optimal traffic balancer, or arbiter, should use the current network status when deciding which link to send packets to. Weights indicating the network status are not always enough, as a bad arbiter may create bursts towards some links which causes high application latency. The queue bursts indicate that some links are temporarily highly congested, and some links are temporarily underutilized. Therefore, ideally all queues should be assigned a traffic bandwidth amount in accordance with their current network status weight.

BRIEF DESCRIPTION OF DRAWINGS

FIG. 3B illustrates an example sparse mapping table for aggregating link weights to balance traffic within queueing systems, in accordance with at least one embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments provide for the balancing of network traffic on parallel links of queueing systems. In particular, various embodiments can spread traffic loads across non-symmetrical network links using a load balancer according to the traffic capacity weight of individual links as a function of time to minimize congestion. In an embodiment, the traffic capacity weight for each link can be represented by a number of bits, N. The load balancer can map each of the representative bits of each link to $2^N$ bit strings, such as by using thermometer coding, where $2^N$ equals the maximum weight that can be applied to a path. The thermometer coding can perform the mapping to output a mapped bit string with the first most bits equal to the link weight set as 1. The thermometer coded bit strings can then be used to generate a sparse representation. In certain embodiments, the representation may be generated using a pre-configured sparse mapping table, a randomly configured mapping table, a linear-feedback shift register (LFSR) machine, and the like. The load balancer can then arrange the bits from all of the relevant parallel link representations as an aggregated sparse vector interleaved sequentially. Round robin scheduling can then be performed for the parallel links using the aggregated sparse vector to queue the network traffic.

Variations of this and other such functionality can be used as well within the scope of the various embodiments as would be apparent to one of ordinary skill in the art in light of the teachings and suggestions contained herein.

Figure 1:
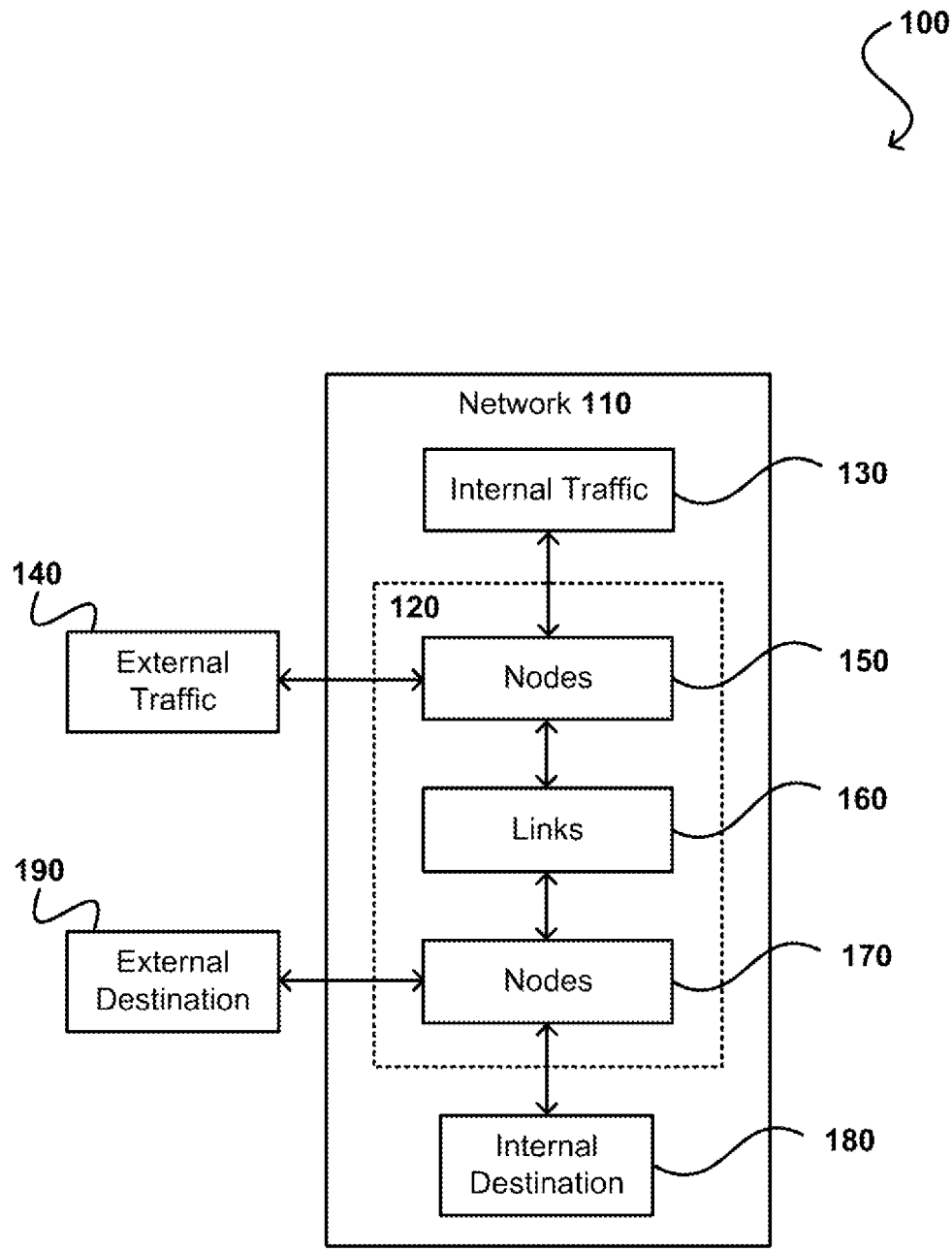
FIG. 1 illustrates an example environment for balancing traffic within queueing systems, in accordance with at least one embodiment.

FIG. 1 illustrates an example environment 100 that can be used to balance traffic between different networking devices of queueing systems, in accordance with at least one embodiment. The illustrated environment 100 includes a network 110 and a load balancer 120. The network 110 may include one or more computing devices that include processors, memories, input/output devices, and the like. For example, in at least one embodiment, network 110 may form a portion of a compute node, such as a node associated with a datacenter. The compute node may be a networked cluster of one or more computing devices that can send and receive information across a network, such as the Internet, and may be networked to one or more additional computing devices. Furthermore, the network 110 may be connected within a common cluster.

In at least one embodiment, the network 110 may handle traffic, such as internal traffic 130 or external traffic 140. For example, the network 110 may transfer data or packets of data within a computer system. The internal traffic 130 may include assignments or packets received from within the network 110 and to be transferred at least partially within the network 110. The external traffic 140 may include assignments or packets received from outside of the network 110 and to be transferred at least partially within the network 110. The internal traffic 130 and external traffic 140 may be received to load balancer 120 to manage the balancing of traffic within the network 110. In an embodiment, the load balancer 120 may manage the traffic on one or more network, one or more sub-networks, or the network may include more than one load balancer 120. The load balancer 120 may include memory, processor, cache, operating system, and the like.

In an embodiment, the network includes input nodes 150 to receive the internal traffic 130 and the external traffic 140 to be routed through the network. The input nodes 150, or traffic origin nodes, may include switches, or a cluster of multiple switches, to direct the traffic. The input nodes 150 may include leaf switches, spines switches, and any suitable switches for transferring the traffic. The network 110 may include output nodes 170 may include switches, or a cluster of multiple switches, to receive the traffic from the input nodes 150. The output nodes 170, or traffic intermediary nodes, may include leaf switches, spines switches, and any suitable switches for transferring the traffic. The input nodes 150 and the output nodes 170 may be connected by a plurality of parallel links 160 in order to transfer the traffic. The input nodes 150, the output nodes 170, and the parallel links 160 may be connected in any suitable configuration or topography to transfer the traffic. In one embodiment, the input nodes 150 may include a leaf switch connected by parallel links to one or more spine switches of the output nodes 170. In another embodiment, the input nodes 150 may include a spine switch connected by parallel links to one or more leaf switches of the output nodes 170. In another embodiment, the input nodes 150 may include a spine switch connected by parallel links to one or more spine switches of the output nodes 170. In some embodiments, traffic may be input to the output nodes 170 to direct the traffic through the parallel links 160 to input nodes 150.

After the output nodes 170 receive traffic from the input nodes 150, the output nodes 170 may direct the traffic to a destination, such as an internal destination 180 within the network or an external destination 190 outside of the network. In an embodiment, the internal destination 180 or the external destination 190 may be nodes connected with the output nodes 170 by a plurality of parallel links. The load balancer 120 or another load balancer may direct this transfer of traffic. The internal traffic 130 and the external traffic may be managed using adaptive routing and other suitable methods. In an embodiment, the adaptive routing may be part of an algorithm. The algorithm and adaptive routing may be used by the load balancer 120. In some embodiments, traffic management, or routing, may first calculate a hash number with a hash function to assign a port of a link 160 for a packet of the traffic. The traffic received from a specific source may be sent through a port assigned to that source. Another source may be assigned a different port over which to send traffic from that source. In an embodiment, each traffic source may be assigned a different port to send packets. The load balancer 120 may control each port of the network 110 with the objective of each port handling or receiving about the same amount of traffic. The adaptive routing mechanism alone may not consider the current network 110 status. For example, traffic may always be sent through a single port even if there is little or no traffic on other ports. Therefore, the status of the ports can be analyzed to determine the best port to send traffic based on congestion levels, which is adaptive routing.

The network 110 of the environment 100 includes parallel links 160 between input nodes 150 and output nodes 170, where available parallel links 160 lead to the same destination. The available ports of each link 160 may be selected based on adaptive routing, which provides the best ports based on congestion levels. In an example, the adaptive routing mechanism can be used to determine that a system includes two ports, each on a separate link 160, with the same low congestion level and determine that the rest of the links are highly congested. The two ports identified by the adaptive routing mechanism can then be assigned the weights of the respective links 160 and determine a routing schedule using load balancer 120 based on the assigned weights.

Figure 2:
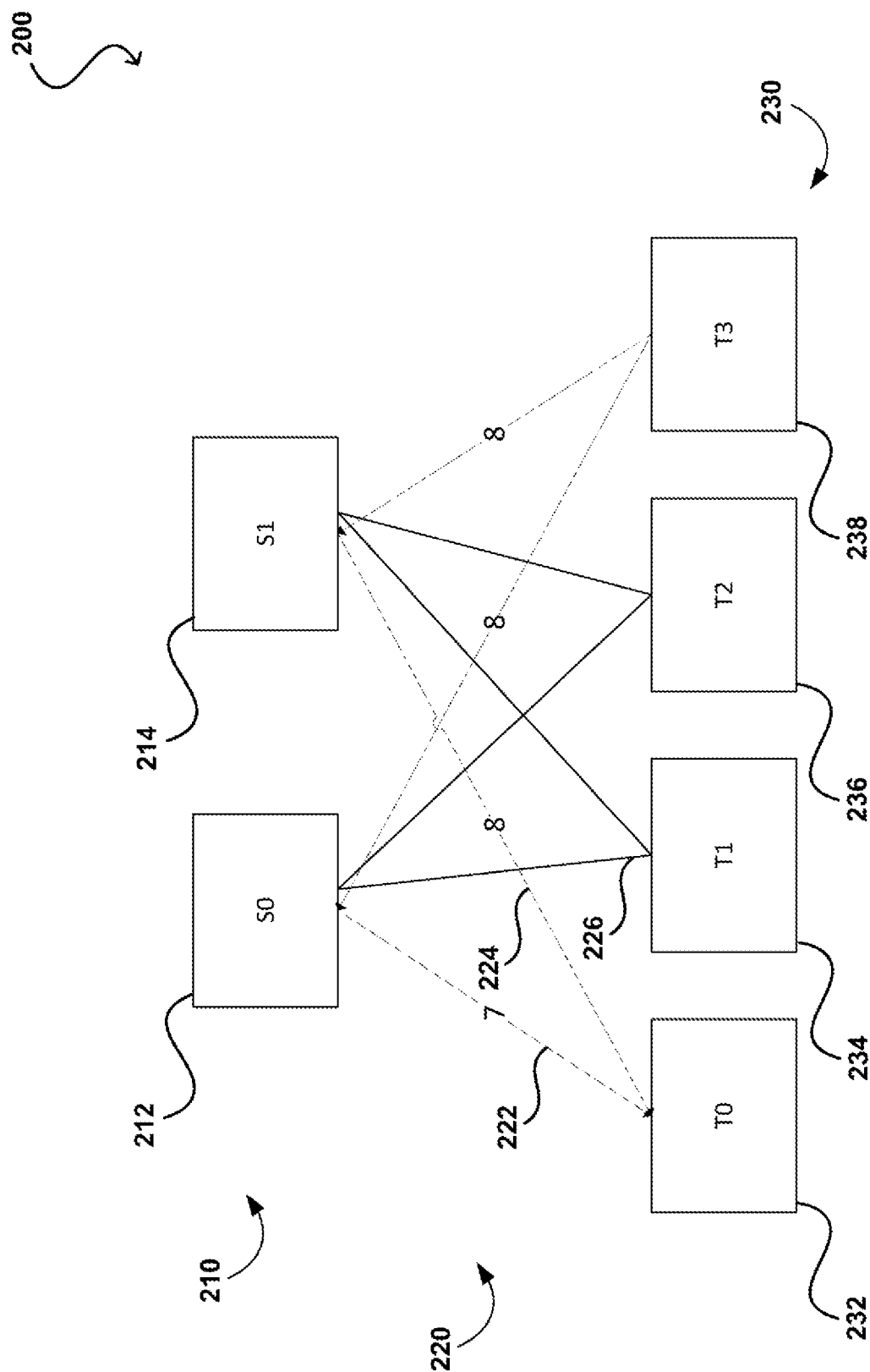
FIG. 2 illustrates an example schematic view of a parallel link network, in accordance with at least one embodiment.

FIG. 2 illustrates a schematic parallel link network 200 that may be used with embodiments of the present disclosure. In this example, the network 200 may include a cluster of multiple nodes or switches in a petri network topography with spine switches 210 and leaf switches 230. A plurality of links 220 connect the spine switches 210 and the leaf switches 230, with the links 220 in parallel between one or more of the spine switches 210 and the leaf switches 230. The traffic on the network 200 can be transferred between the spine switches 210 and the leaf switches 230 using the plurality of links 220. In one embodiment, the traffic may be sent from the spine switches 210 to the leaf switches 230 or may be sent from the leaf switches 230 to the spine switches 210. By way of example, if the network 200 sends traffic through a switch T0 232 towards a switch T1 234, the traffic can be sent over multiple routes, such as from the switch 232 to a switch S0 212 to the switch 234 or from the switch 232 to a switch S1 214 to the switch 234. Since there are multiple links 220 between each of the switches, each of links 220 may be used to send traffic. For example, the link 222 between switch 232 and switch 212 has seven ports and the link 224 between the switch 232 and the switch 214 has eight ports. The switch 232 can pick any of the seven ports of link 222 to go to switch 212 since they are parallel links. In an example, one port of link 222 may be down between the switch 232 and the switch 212, so the route between the switch 232 and the switch 212 of link 222 has seven ports while the other links 220, including link 223 and 226, have eight operational ports.

A queuing system for a switch 232, 234, 236, 238 may decide the best port of the links 220 to send traffic. In the above example, ideally 7/8 of the traffic should be sent from switch 232 towards switch 212 over the link 222 and 8/8 traffic should be sent towards switch 214 over the link 224. More generally, the traffic towards switch 214 should be higher than the traffic towards switch 212 because more ports are available. Since all of the spine switches 210 are connected to all the leaf switches 230, the traffic can be transferred using any of the spines switches 210. A load balancer can determine how the leaf switches 230 decide which port of the links 220 to send data through and at what time. A balancer of the queuing system may be an arbiter that decides which port to choose each time an assignment is to be made for transferring traffic over the network 200. In an embodiment, when there are two possible links with different weights, where the link 222 has a weight of 7/16 and the link 224 has a weight of 8/18, 7/16 packets of the traffic to be assigned can be sent towards switch 212 on link 222 and 8/16 packets of the traffic to be assigned can be sent towards switch 214 over link 224. This determination can be made by first selecting the best possible ports of the links 220 using adaptive routing, then the weights of the links 220 are determined. After determining the weights, the ports of the links 220 over which to send the traffic are selected in accordance with an algorithm. Then a weighted round robin schedule can be followed in accordance with the weights.

As shown, each of the leaf switches 230 may be connected to multiple links 220, where some links may connect to the spine switch 212 and other links may connect to the spine switch 214, and each of the links 220 may be assigned a weight. For example, the link 222 between the leaf 232 and the spine 212 has a weight of seven. The link between the leaf 232 and the spine 214 has a weight of 8. The weights may indicate the percentage of the traffic that should be sent towards each of the spine switches 210. If both links had weights of 8, ideally fifty percent of the traffic would be sent to the spine 212 and fifty percent of the traffic would be sent to the spine 214. A weight may be assigned to each of the links. The weight can be calculated using any suitable method, as long as it indicates the percentage of traffic a link 220 can handle. The weighting can be determined based at least in part on link or port failure between switches, lowering the weight. The weighting can be determined based at least in part on links having different bandwidth capacity, where some links are faster, or some links are slower. The weight for each link may be assigned based on the capacity to send traffic, such as data or packets. Therefore, the weight of each link towards each spine may be known.

According to a legacy solution, to send packets from switch 232 to switch 234 with the spine switches 212 and 214, the ports 220 can be picked randomly from the 15 available ports. Some ports may randomly go to spine 212 and some ports may randomly go to spine 214. In an example, if a million packets are sent the traffic may converge to the right percentages. However, the randomness may lead to instances of congestion due to poor random selection, sending too many consecutive packets go a single spine, increasing latency. When transferring a substantial amount of data over the network, spikes in the traffic over each link 220 may occur, since at times spine 212 may send very little and at times spine 214 may send very high amounts of traffic, and vice versa. This can become a problem because time sensitive applications, such as video streaming or machine learning training, running on the network can experience latency. Another legacy solution may use only round robin scheduling to manage traffic, where packets are sent alternatingly through spine 212 and spine 214 in turn. This may work well when both spines have equal weights but may become problematic when the spines are not equally weighted, such as if a port becomes non-operational, and a slower link can become congested, while another link may have more capacity. The sparse thermometer coding weighted round robin load balancer uses a longer time window to spread traffic evenly over time, using smaller segments at a time and avoiding sending traffic in chunks. This may reduce latency, and specifically reduce tail latency, evening out bandwidth as much as possible over time.

A load balancer may be used in a wide variety of networks, as may include a networking cluster with multiple switches that connect data between them. Such a load balancer may be used with any switches, such as spectrum switches, quantum switches, Ethernet, InfiniBand, and the like. Additionally, such a balancer may be implemented with various queuing systems, such as may include a CPU that runs multiple jobs and connecting to another CPU with jobs to complete. In another embodiment, such a load balancer may be used with a single centralized computer with many decentralized cores to assign each core a different job, to determine which core gets each job. As the number of links increases and the granularity of the weights increase, the benefits of the sparse thermometer coding weighted round robin load balancer may increase.

Figure 3A:
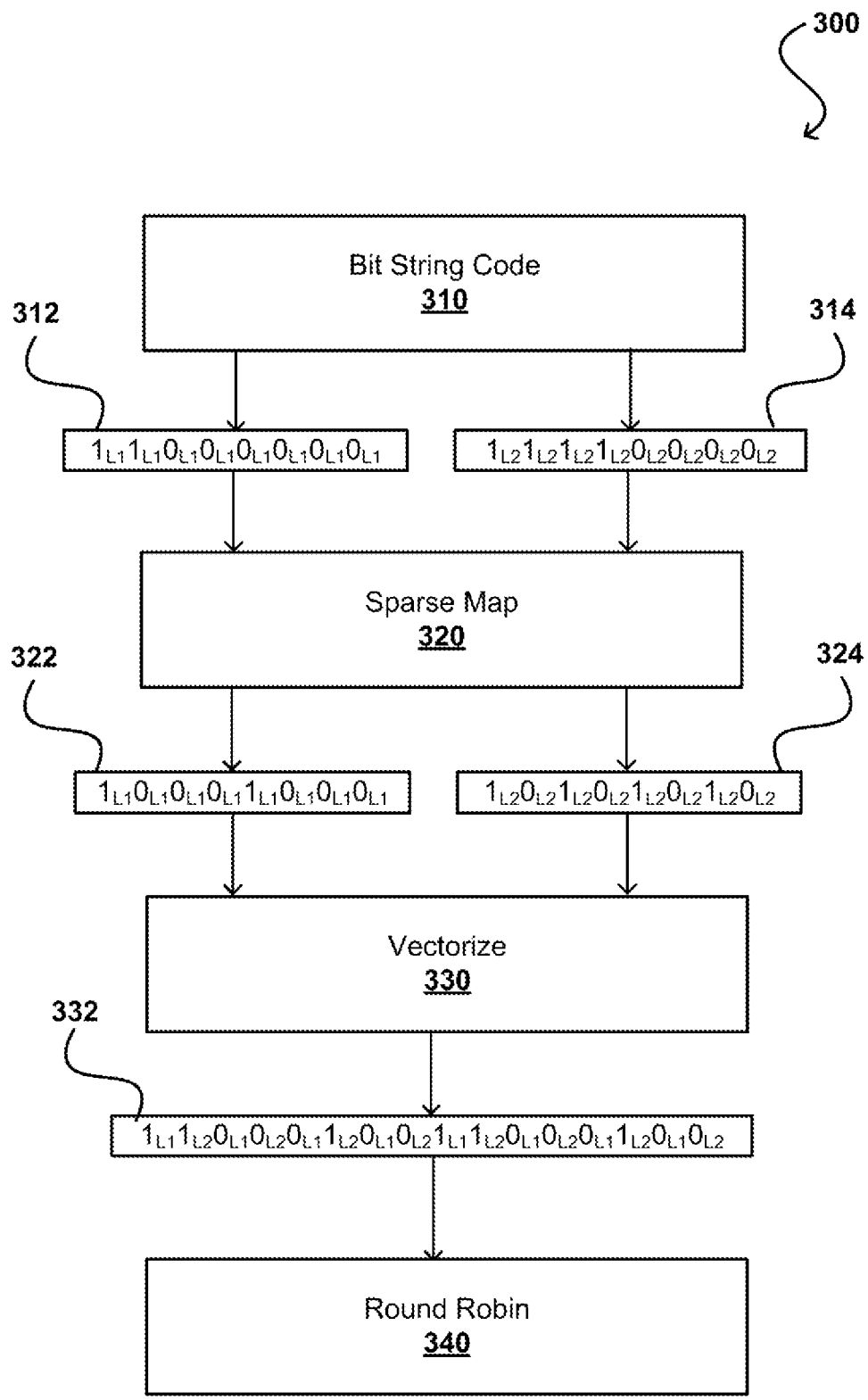
FIG. 3A illustrates an example schematic view for aggregating link weights to balance traffic within queueing systems, in accordance with at least one embodiment.

FIG. 3A illustrates a schematic diagram 300 that may be used with embodiments of the present disclosure. In this example, a load balancer may include a bit string coding resource 310 that may receive the weights of parallel links between nodes or switches within a network and provide the weights as link weight bit strings 312, 314. Each link in this example, may be assigned N bit weights indicating the percentage of traffic each respective link should handle. The weight can be calculated by any suitable method. Different considerations and factors can be used to determine the weight. If a change in available capacity occurs, such as a port or link drops, then the weight can be updated automatically and dynamically allocated. The weights may be in accordance with either the number of available links or number of shutdown links. In another embodiment, links may also be weighted using total root distance, and the shortest and longest path between the origin switch and the destination switch. In a dragonfly a topology, there may be multiple ways to start traffic from an origin switch to a destination switch, but some paths are shorter and so the weight can be applied to indicate the path distance. Another option may be weighing links based on their capacity, such as weighting 100 Gigabit capacity differently from 10 Gigabit links. In that case, the weight may be 10 times higher. In another example, the weight may be based on the likelihood of a port or parallel link drop based on any number of factors, or if ports or links may be used for other traffic. Weight can be dynamically changed in accordance with the network status, such as occurrences of congestions and the like.

The bit string coding resource 310 or function may map the N bits as $2^N$ bits using a suitable method, such as thermometer coding and the like. For example, if there is three bits of weight, and a link has weight of two, applying thermometer coding the link weight will be mapped as eight bits, because two to power three equals eight, and the total of turned-on bits, 2, is the weight, as shown in bit string 312. If the weight of the link is eight, for example, all eight bits of the bit string would be turned on. Thermometer coding may indicate how many bits to turn on and may align the turned-on bits to the left of a bit string, bit vector, and the like. In an example, if the network has two available links, the mapping function 310 may output the weights as the first link weight bit string 312 and the second link weight bit string 314. As is shown, the turned-on bits of the link weight bit strings 312, 314 with value of "1" may indicate the weight assigned to the respective links. In another embodiment, the turned off bits of the bit strings 312, 314 with value of "0" may indicate the weight assigned to the respective links. Accordingly, the first link may have a weight of two according to the bit string 312 and the second link may have a weight of four according to the bit string 314.

As shown, a load balancer may include a sparse mapping resource 320 that may receive the link weight bit strings 312, 314 and provide sparse weight bit strings 322, 324. The sparse mapping resource 320 or function may scramble the order of the bits such that the bits will be sparse. Accordingly, the first link may have a sparse weight bit string 322 and the second link may have a sparse weight bit string 324. For example, after applying the thermometer coding the link weight bit strings 312, 314 may be generated. Then the link weight bit strings 312, 314 may be put in a table or in a function which output bit string or vector where the bits are spars, or spaced out, but maintain the same weight of the link. In an embodiment, the sparse mapping resource 320 may include a randomly configured table, a dynamically configured table, or other suitable systems. To perform this transformation, a preconfigured table may be used to input the bit strings and the table scrambles the bits. As shown in FIG. 3B, an example preconfigured table includes output vectors from the function. By way of example, there may be two options to send traffic from a leaf switch, a first spine and a second spine. The thermometer coded bits to each of them may be calculated. Then the calculated coded bits may be scrambled in the vector. Then two vectors may be provided, including a first vector indicating the weight of the path towards the first spine, and a second vector indicating the weight of the path towards the second spine. The vectors may be put through a table function and a different vector arrangement is output with the turned-on bits made more sparse or spread out.

As shown, a load balancer may include a vectorize resource 330 that may receive the sparse weight bit strings 322, 324 and provide a combined sparse weight vector 332. The vectorize resource 330 or function may combine, or merge, the available path vectors together into one single vector 332. In an embodiment, the load balancer may use the vectorize resource 330 to arrange all the bits belonging to all links in the parallel links group as an aggregated sparse vector with the bits interleaved sequentially from the provided sparse weight bitstrings, maintaining the order of the parallel links and maintaining the position of the bits within the sparse bit strings. The number of vectors, or it strings, to be combined may be the number of spines, or available parallel link, which can be used to transfer the traffic. In an example, and after applying the thermometer coding and sparse table three separate bit strings, the bit vectors are transformed using the vectorize resource 330 into a combined sparse weight bit vector 332 that is made of the combination of the three vectors. The bits of the combined sparse weight vector 332 are arranged with one from each individual bit string added at a time in order from the left to the right. In another embodiment, another order may be used. Accordingly, the first link with the link weight bit string 312 and the second link with the link weight bit string 314 may have a combined sparse weight vector 332.

As shown, a load balancer may include a round robin resource 340 that may receive the combined sparse weight vector 332 and perform round robin scheduling. The round robin resource 340 function may decide that each link is provided data according to the combined sparse vector 332. Standard round robin processes may only decide that each available path will one turn in sequence each. The weighted round robin of sparse thermometer coding weighted round robin load balancer using the round robin resource 340 may decide that each path has an amount of turns in accordance with their weight. In the network of FIG. 2, there are a total of fifteen ports from the leaf switch 232 to the leaf switch 234. Using only round robin scheduling without the processing performed by sparse thermometer coding weighted round robin load balancer, ports can be chosen alternating between the spine switch 212 and the spine switch 214, where the spine switch 212 has only seven ports and the spine switch 214 has eight ports, which may be less than optimal.

The sparse mapping resource 320 processing of the link weight bit strings 312, 314 to scramble the bits may prevent congestion, specifically, preventing unwanted bursts of traffic that would occur otherwise, such as if the combined vectors were weighted and aligned but not sparse. In an example, two links having the same weight may be weighted, ordered, and combined, but not made to be sparse and have the link weight bit strings 312, 314, the combined, non-sparse vector may be the combined sparse weight vector 332. Therefore, all the traffic to each spine may be sent at once as a burst, and then traffic will pause to the spines where no packets are sent. The first packet may be sent to the first link, second packet may be sent to the second link, and then no packets are sent. Then packets may be sent only to the second spine, and then none will be sent. This may cause congestion and unwanted bursts of traffic towards the spines. Another option may include two links having the same weight that may be weighted, combined, and ordered, but not made to be sparse, however traffic may be seal at once and then no traffic would be sent for a long pause, causing congestion and inefficiency.

In an embodiment, using the sparse thermometer coding weighted round robin load balancer the combined vector 332, which is a merge of the weights of the two spines, may determine the round robin scheduling performed by the round robin resource 340. In an example, if the first bit of the combined vector 332 is turned on, or is represented by a "1", the next forward decision, such as for a packet or queuing object, may to the first port of the first represented link or spine. However, if a bit is turned off, or is represented by a zero, then a packet may not be sent through that port. If the next object for the second link is turned on, or is represented by a "1", the next packet may go to the first port of the second link. If the next bit turned off, or is zero, a packet is not sent to the first link. If the next bit is "1" a packet is sent to the second link, and so on. The sparse mapping resource 320, as referenced by the round robin resource 340, may reduce bursts towards the spines and may reduce congestion, making the queues more evenly distributed.

FIG. 3B illustrates an example sparse mapping table 350 that may be used with embodiments of the present disclosure, such as with sparse mapping resource 320 of FIG. 3A. In this example, the table 350 may be a preconfigured table, or may be a table that is generated, such as at a desired interval, upon request, and the like. The table may be referenced, such as by sparse mapping resource 320, and the relevant information output based on the input vector. In an embodiment, the table may be a sparse algorithm, program, and the like, that can sparse out the bits within a bit string. The sparse mapping table 350 may include a number of weight rows 360, or weight lines, which are referenced according to the provided weight of the input bit string. The sparse mapping table 350 may include a number of bit index columns 370 that include the appropriate sparse bits for each bit index position within each weight row 230. The table 350 may include sparse link weight bit strings 380 for corresponding link weights between two switches, where each of the sparse link weight bit strings 380 include the bits for the relevant weight row according to the position of the bits in the bit index columns 370. An input, such as a bit string or bit vector, may be provided to the table and translated to a sparse bit string 380 or sparse bit vector. Sparse mapping table 350 as shown may be configured for a sixteen-bit link vector with up to four bits of weight, where N equals four and $2^N$ equals sixteen. For example, a sixteen-bit link vector can be provided to the table 350. The table 350 can output a sixteen-bit sparse vector 380. If an input vector includes 0 weight, the output 380 may include all zeros as show in the weight row 360, or the weight line, of Weight0. If an input vector includes weight of one, then the output 380 may be provided as on the weight row 360 of Weight1. If an input vector includes weight of sixteen, then the output 380 may be provided as on the weight row 360 of Weight16. However, any number of tables could be used, and the output may also depend on the sparse algorithm.

In another example, referring back to FIG. 2, the seven-weight bit string of the link 222 between the leaf switch 232 and the spine switch 212. In this example the number of available bits in the weight is three bits. Therefore, as N=3 and eight is the maximum weight, bit string code resource 310 may provide a bit string with eight bits and seven bits turned on. Then applying the thermometer coding using sparse mapping resource 320 an eight-bit vector may be output. With an input of a $2^N$ equal eight vector with seven weight, the sparse mapping table 350 may output a sparse bit string 380 with a total of eight bits and seven bits turned on and sparse. In one embodiment, the table 350 may generated by randomly placing the weighted bits in the vector. For example, each time bits of a bit string are to be made sparse, random shuffling may be applied, where each row may be randomly shuffled. In another embodiment, the bit placement could be randomly generated when provided a vector without using a table. Using randomly placed bits may lead to some vectors being more or less sparse.

Figure 4:
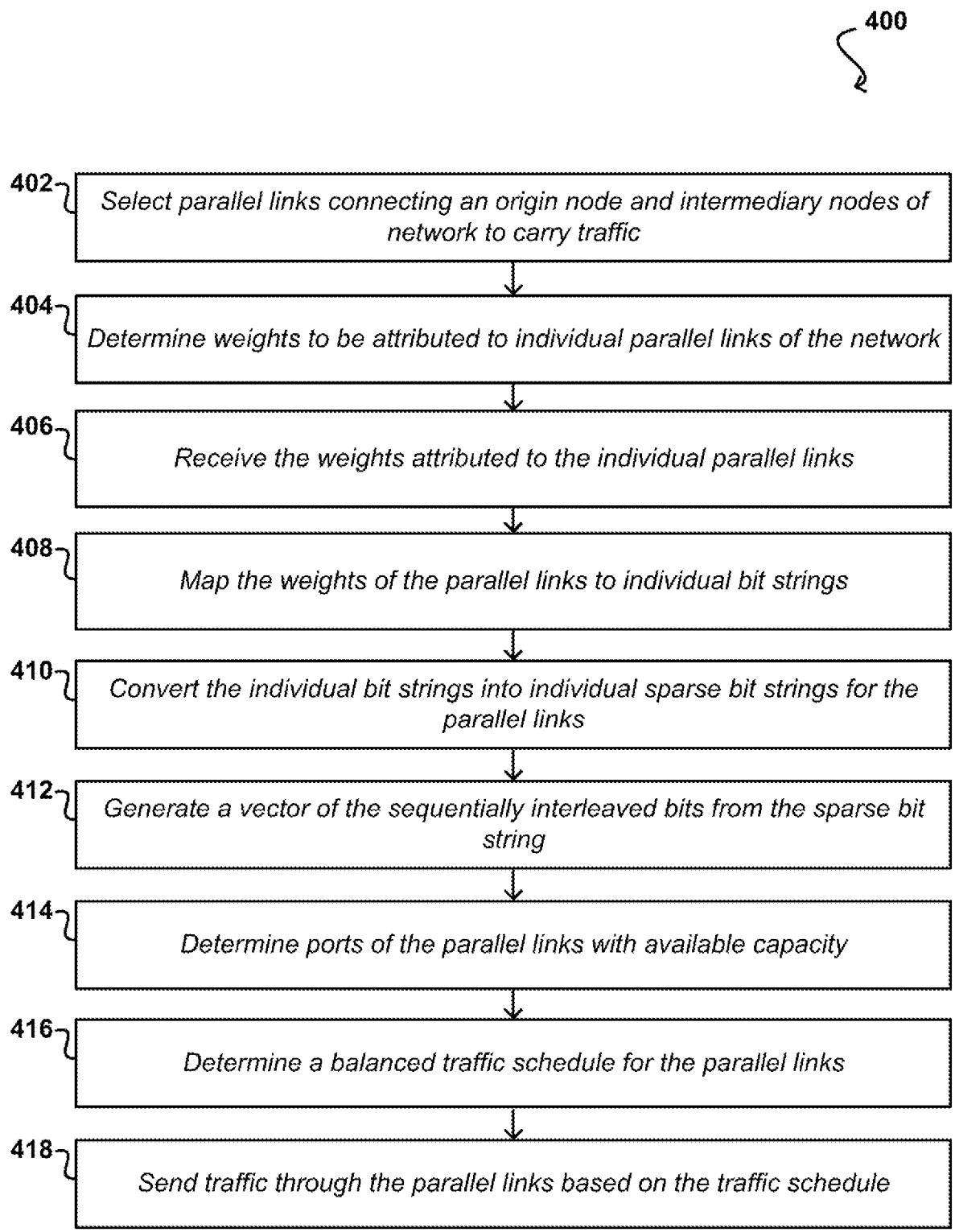
FIG. 4 illustrates an example process for managing traffic within a queueing system, in accordance with at least one embodiment.

FIG. 4 illustrates an example process 400 that can be used to manage traffic within queueing systems in accordance with various embodiments. It should be understood that for this and other processes presented herein that there may be additional, fewer, or alternative operations performed in similar or alternative orders, or at least partially in parallel, within the scope of the various embodiments unless otherwise specifically stated. Further, while this example refers to ports, it should be understood that various other components may also use such a process within the scope of various embodiments. In this example, parallel links connecting at least an origin node and intermediary nodes are selected 402 to carry traffic. The origin node and the intermediary nodes may be part of a network, such as a computer network, which includes nodes that may carry traffic over parallel links. The nodes may be leaf nodes, spine nodes, or other suitable nodes in a network with parallel links. The traffic may include packets, such as packets of information to be transferred within the network. Weights to be attributed to the individual parallel links of the network may be determined 404. The weights may be determined using a suitable system or method, such an algorithm or measurement. For example, the weights may be based on one or more metrics of the links that affect the ability to carry traffic. The parallel link weights may be determined based on the traffic to be scheduled. The weights attributed to the individual parallel links may be received 406 in order to determine a schedule for the traffic over the parallel links. The parallel link weights may be received along with weights for other links in the network. Furthermore, weights for parallel links that will not be used for the traffic may also be received.

The individual weights of the parallel links may be mapped 408 to individual bit strings. In at least one embodiment, the bits with the same value of each bit string may be assigned to indicate the weight of the individual links. For example, the turned-on bits of a string may indicate the weight of the corresponding link. The combined number of bits of each bit string having the shared valued may equal the individual weights of the individual bit strings. The individual bit strings may be converted 410 into individual sparse bit strings for the parallel links. For example, the bit strings may be converted into the sparse bit strings using thermometer coding, or other suitable methods. The sparse bit strings may be the same length as the unconverted bit strings. A vector may be generated 412 with sequentially interleaved bits from the sparse bit string. Furthermore, the vector may be generated using a pre-configured mapping function. In an example, the pre-configured mapping function may be a randomizer, a LFSR machine, or other suitable function.

The ports, of the parallel links, with available capacity to handle traffic may be determined 414. In an embodiment, the ports of the parallel links that will handle the traffic may be determined. In another embodiment, availably of all ports in a network or a sub-network may be determined. Ports that have more capacity than a number of other ports may be determined, such as to set a baseline. A balanced traffic schedule for the selected parallel links may be determined 416 for traffic over the parallel links. The parallel links may be scheduled using a weighted round robin schedule, or other suitable schedules. The schedule may be determined based on other traffic scheduled over the selected parallel links or other parallel links in the network. The traffic may be sent 418 through the parallel links based on the traffic schedule. The scheduled traffic through the selected parallel links may be sent using the ports of the selected parallel links. The weights of the parallel links may be updated for additional traffic based on the scheduled traffic. In this manner, the network traffic may be monitored and balanced based on the status of the parallel links while preventing delays or congestions of traffic within the network.

Figure 5:
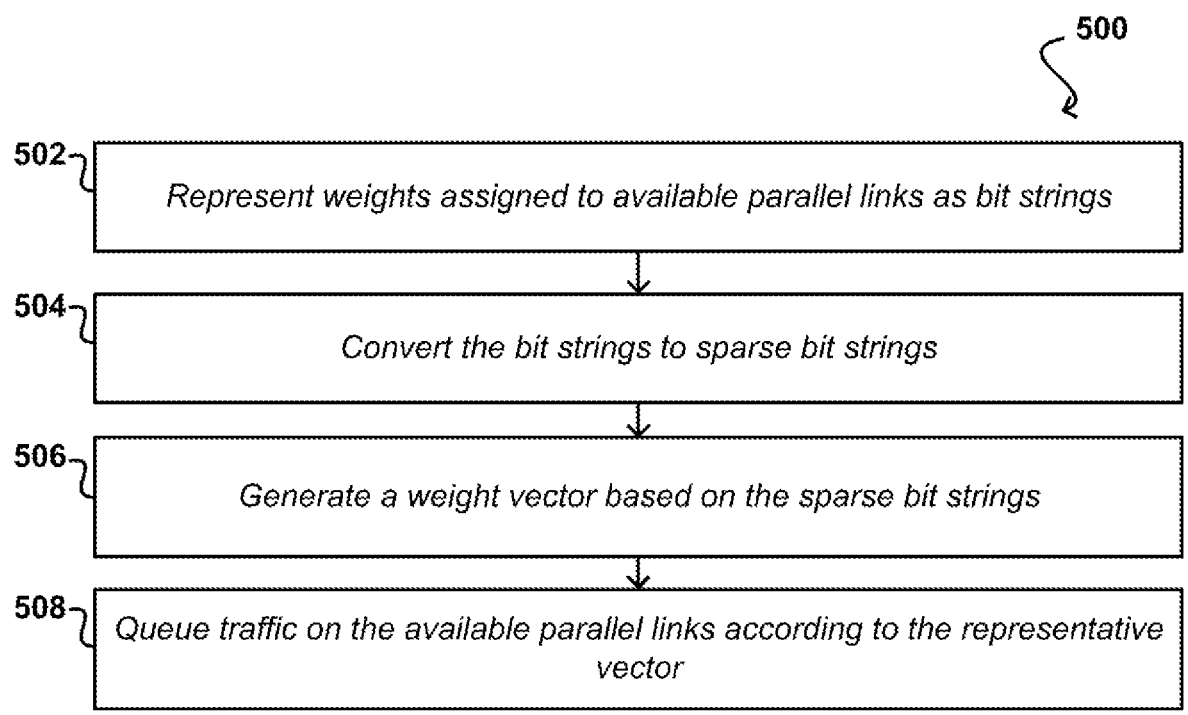
FIG. 5 illustrates an example process for managing traffic within a queueing system, in accordance with at least one embodiment.

FIG. 5 illustrates an example process 500 that can be used to manage traffic within queueing systems. In this example, weights assigned to available parallel links are represented 502 as bit strings. The weights assigned to the available parallel links may indicate the available bandwidth for traffic over the links. In an embodiment, the weights may be based on the number of available ports of the corresponding links. A bit value of the bit strings, such as a bit value of one, may indicate a weight unit of the corresponding links. As an example, if a bit string has five turned on bits, then the weight assigned to the link can be five. Each of the bit strings can include a number of representative bit values to indicate the assigned weight of the links. The bit strings are converted 504 to sparse bit strings to represent the weight assigned to the parallel links. The sparse bit strings may have the same number of number of bits indicating the weight of the links as the pre-converted bit strings. As an example, if a bit string has five turned on bits, the sparse bit string may also have five turned one bits. The bits of the sparse bit string may be spread throughout the sparse bit string to ensure bits of the same value are spread throughout. In an embodiment, the placement of the bits in the sparse bit string may be random.

A weight vector is generated 506 based on the sparse bit strings. The bits of the vector may be sequentially interleaved from the sparse bit string, in order to maintain the position of the bits from the sparse bit strings. In an embodiment, all of the sparse bit strings of the available parallel links may be combined into the weight vector. Including the sequentially interleaved bits allows the order of the paralleled links to be maintained while also allowing for the position of the bits within the sparse bit strings to be maintained. Traffic on the available parallel links is queued 508 according to the representative vector. Using the position of the bits within the weight vector for queuing maintains the order of the parallel links and the position of the bits from the sparse vector. Traffic may be assigned to the parallel links based on the queue and sent through the network on the parallel links. In an embodiment, the assignments are sent according to a weighted round-robin schedule. In this manner, traffic may be managed within queueing systems by balancing assignments through parallel links of a network.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
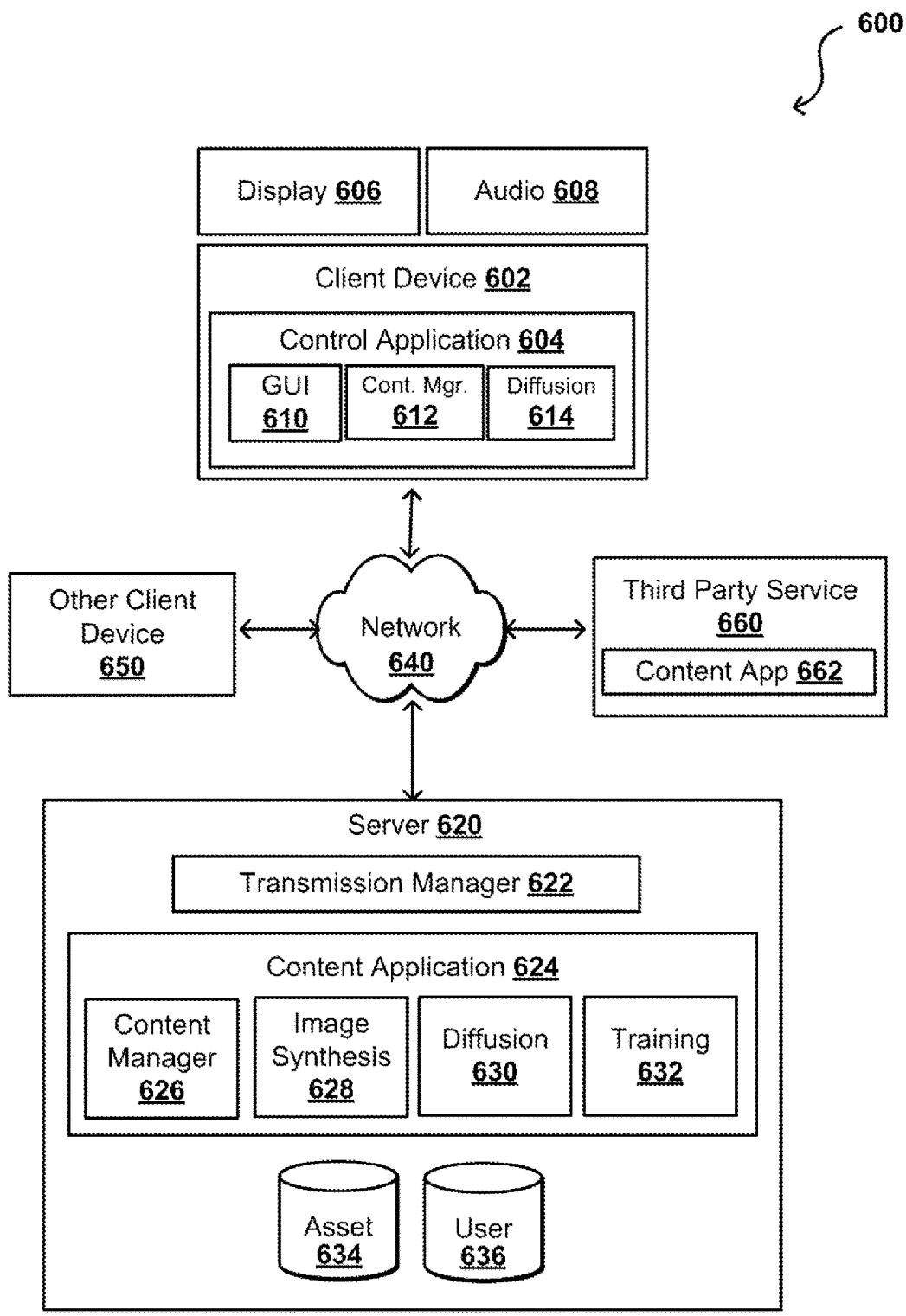
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Data Center

Figure 7:
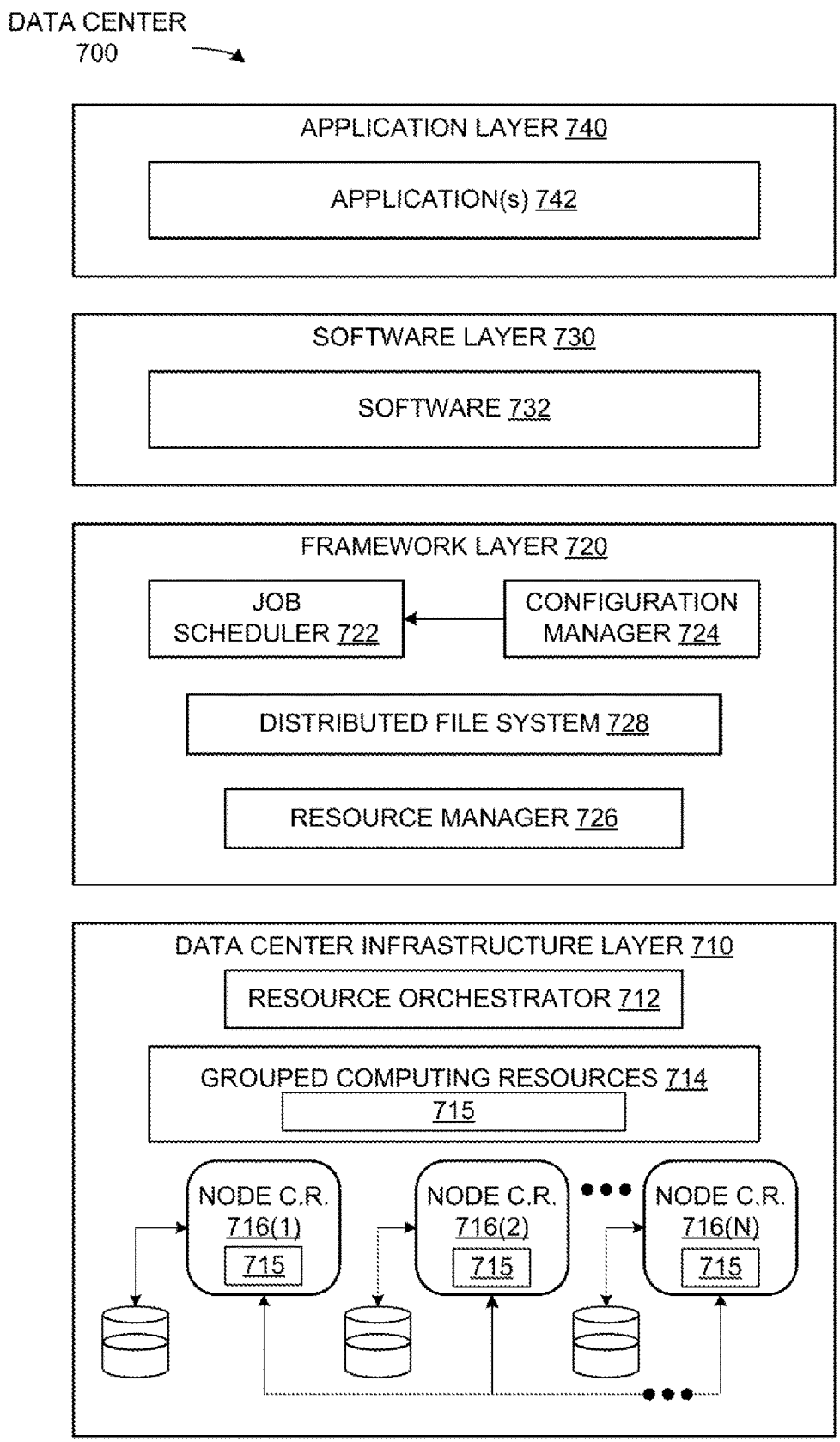
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 814 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underused and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in system FIG. 7 for inferencing or predicting operations based, at least in part, on weight parameters calculated using neural network training operations, neural network functions and/or architectures, or neural network use cases described herein.

Embodiments presented herein can allow for a load balancer with one or more features for balance traffic within queueing systems.

Computer Systems

Figure 8:
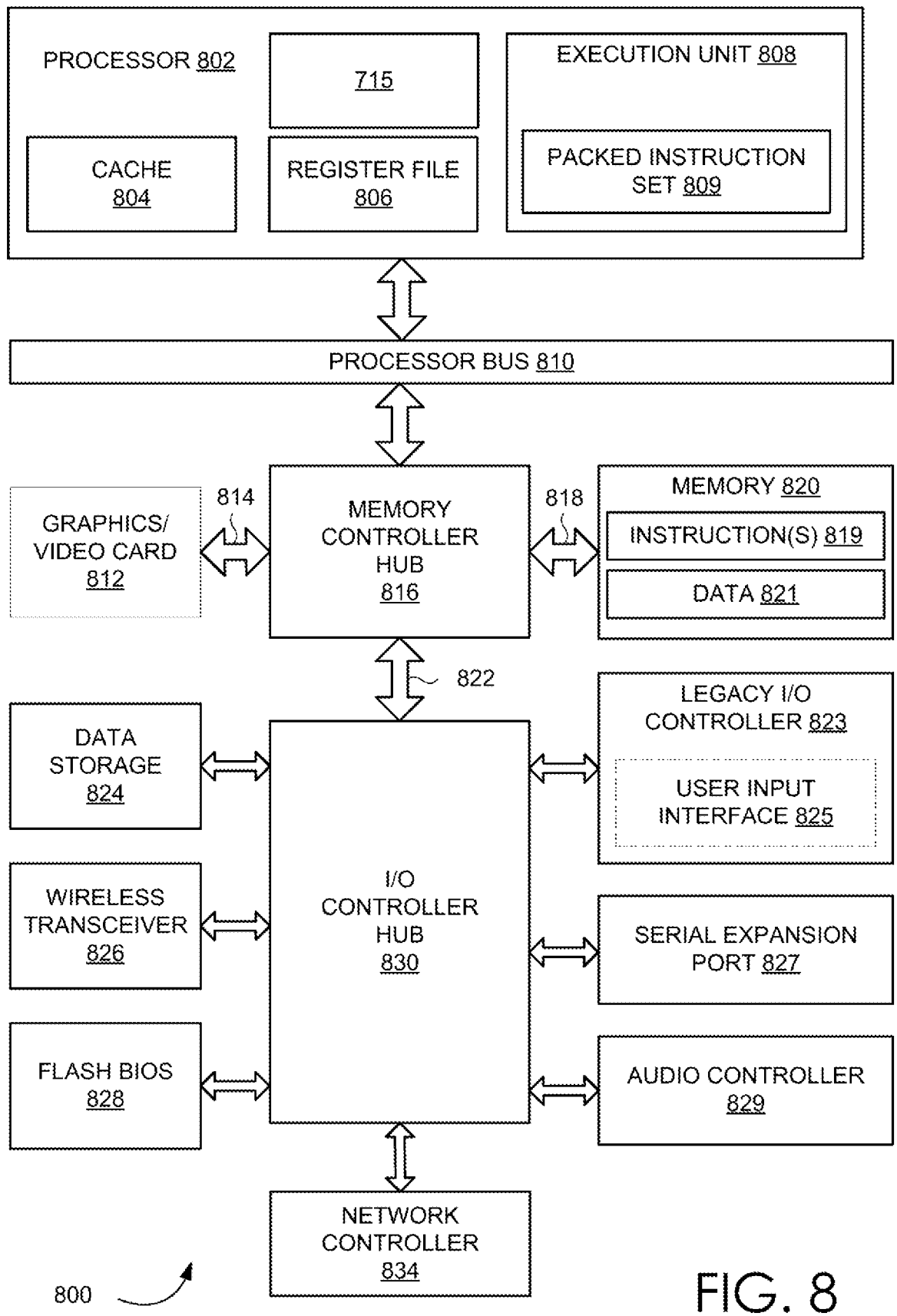
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interface(s) 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 715 are used to perform inferencing and/or training operations associated with one or more embodiments. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Embodiments presented herein can allow for a load balancer with one or more features for balance traffic within queueing systems.

Figure 9:
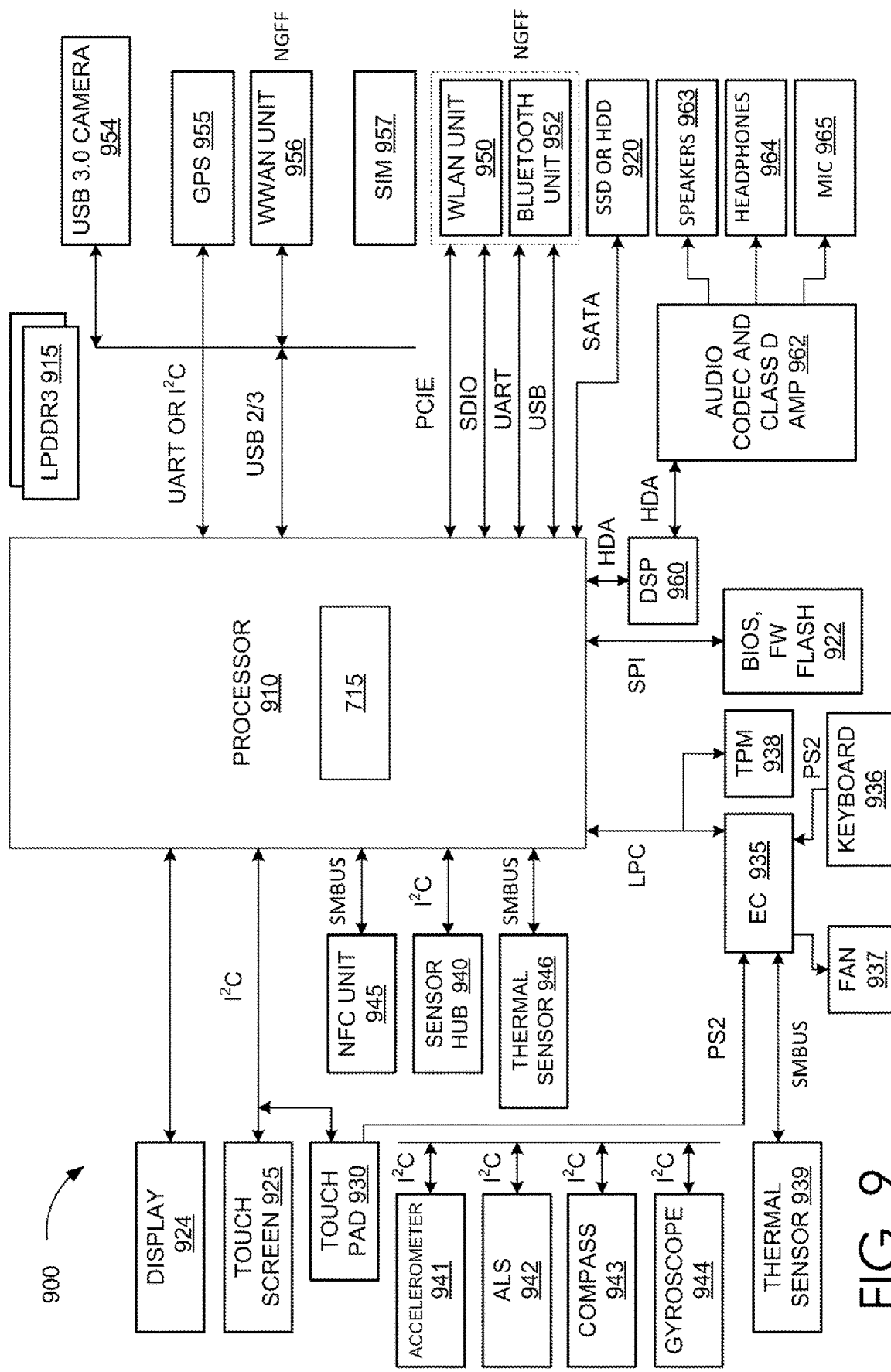
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speakers 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 715 are used to perform inferencing and/or training operations associated with one or more embodiments. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Embodiments presented herein can allow for a load balancer with one or more features for balance traffic within queueing systems.

Figure 10:
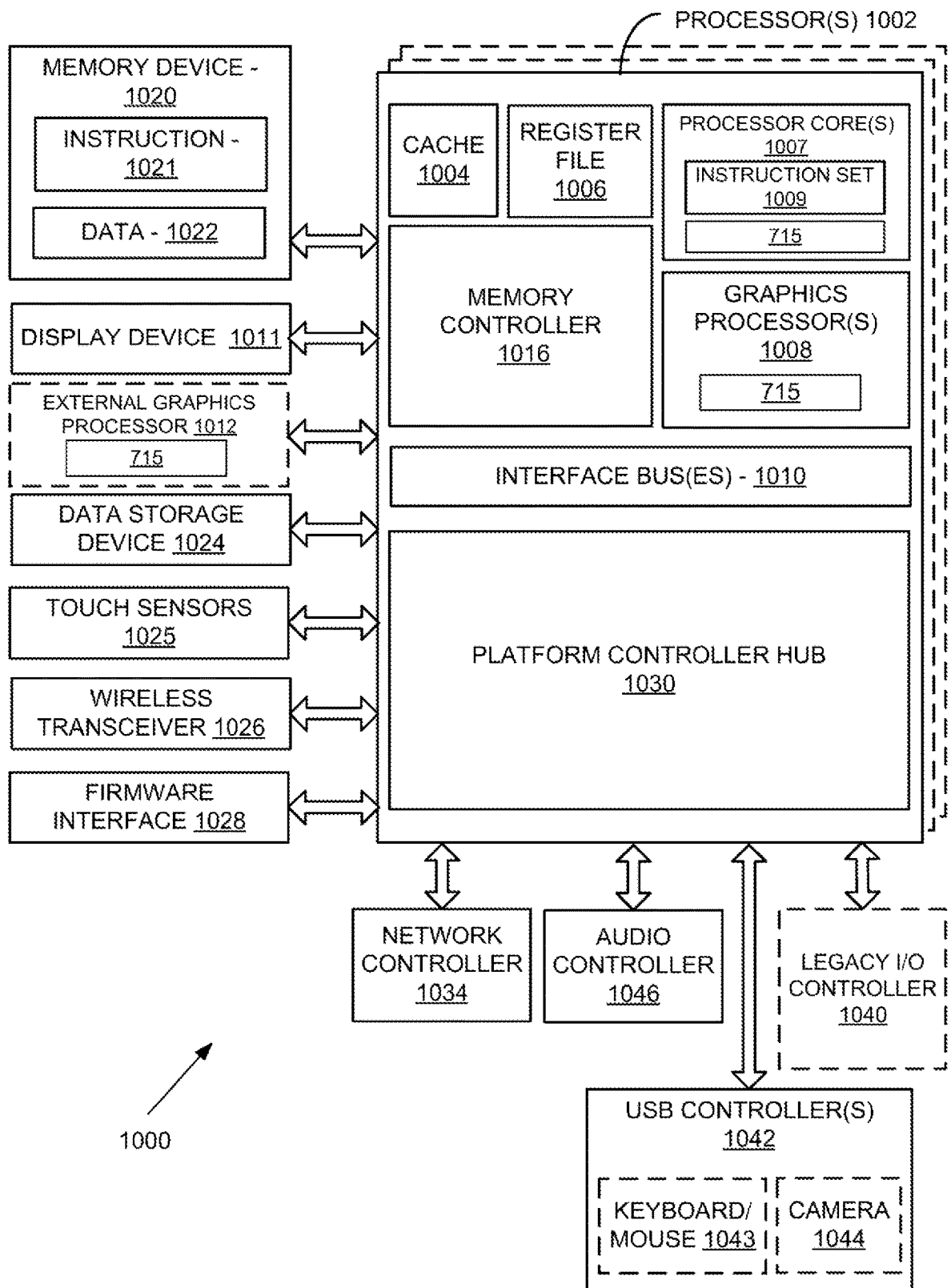
FIG. 10 illustrates at least portions of a graphics processor, according to one or more embodiments.

FIG. 10 is a block diagram of a processing system, according to at least one embodiment. In at least one embodiment, system 1000 includes one or more processor(s) 1002 and one or more graphics processor(s) 1008, and may be a single processor desktop system, a multiprocessor workstation system, or a server system having a large number of processor(s) 1002 or processor core(s) 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processor(s) 1002 and a graphical interface generated by one or more graphics processor(s) 1008.

In at least one embodiment, one or more processor(s) 1002 each include one or more processor core(s) 1007 to process instructions which, when executed, perform operations for system and user software. In at least one embodiment, each of one or more processor core(s) 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor core(s) 1007 may each process a different instruction set 1009, which may include instructions to facilitate emulation of other instruction sets. In at least one embodiment, processor core(s) 1007 may also include other processing devices, such a Digital Signal Processor (DSP).

In at least one embodiment, processor(s) 1002 includes cache memory 1004. In at least one embodiment, processor(s) 1002 can have a single internal cache or multiple levels of internal cache. In at least one embodiment, cache memory is shared among various components of processor(s) 1002. In at least one embodiment, processor(s) 1002 also uses an external cache (e.g., a Level-3 (L3) cache or Last Level Cache (LLC)) (not shown), which may be shared among processor core(s) 1007 using known cache coherency techniques. In at least one embodiment, register file 1006 is additionally included in processor(s) 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor(s) 1002 and other components in system 1000. In at least one embodiment, interface bus(es) 1010, in one embodiment, can be a processor bus, such as a version of a Direct Media Interface (DMI) bus. In at least one embodiment, interface bus(es) 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instruction 1021 for use when one or more processor(s) 1002 executes an application or process. In at least one embodiment, memory controller 1016 also couples with an optional external graphics processor 1012, which may communicate with one or more graphics processor(s) 1008 in processor(s) 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor(s) 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus(es) 1010. In at least one embodiment, audio controller 1046 is a multi-channel high definition audio controller. In at least one embodiment, system 1000 includes an optional legacy I/O controller 1040 for coupling legacy (e.g., Personal SYSTEM 2 (PS/2)) devices to system. In at least one embodiment, platform controller hub 1030 can also connect to one or more Universal Serial Bus (USB) controller(s) 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Inference and/or training logic 715 are used to perform inferencing and/or training operations associated with one or more embodiments. In at least one embodiment portions or all of inference and/or training logic 715 may be incorporated into graphics processor(s) 1008. For example, in at least one embodiment, training and/or inferencing techniques described herein may use one or more of ALUs embodied in a graphics processor. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Embodiments presented herein can allow for a load balancer with one or more features for balance traffic within queueing systems.

Figure 11:
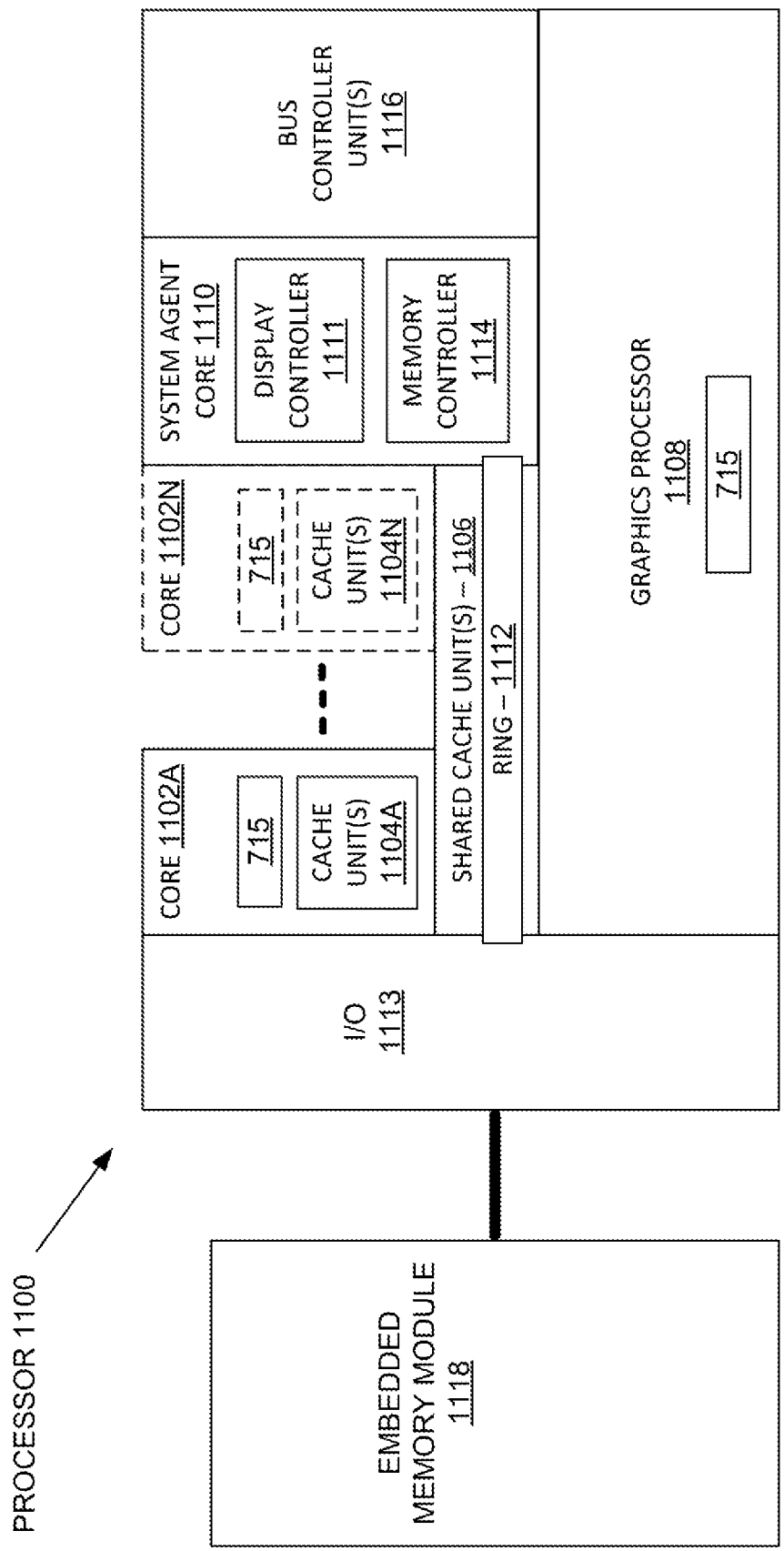
FIG. 11 illustrates at least portions of a graphics processor, according to one or more embodiments.

FIG. 11 is a block diagram of a processor 1100 having one or more processor core(s) 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor core(s) 1102A-1102N includes one or more internal cache unit(s) 1104A-1104N. In at least one embodiment, each processor core also has access to one or more shared cached unit(s) 1106.

In at least one embodiment, internal cache unit(s) 1104A-1104N and shared cache unit(s) 1106 represent a cache memory hierarchy within processor 1100. In at least one embodiment, cache unit(s) 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1106 and 1104A-1104N.

In at least one embodiment, processor 1100 may also include a set of one or more bus controller unit(s) 1116 and a system agent core 1110. In at least one embodiment, one or more bus controller unit(s) 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor core(s) 1102A-1102N include support for simultaneous multi-threading. In at least one embodiment, system agent core 1110 includes components for coordinating and operating processor core(s) 1102A-1102N during multi-threaded processing. In at least one embodiment, system agent core 1110 may additionally include a power control unit (PCU), which includes logic and components to regulate one or more power states of processor core(s) 1102A-1102N and graphics processor 1108.

In at least one embodiment, processor 1100 additionally includes graphics processor 1108 to execute graphics processing operations. In at least one embodiment, graphics processor 1108 couples with shared cache unit(s) 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring based interconnect unit 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor core(s) 1102A-1102N and graphics processor 1108 use embedded memory modules 1118 as a shared Last Level Cache.

In at least one embodiment, processor core(s) 1102A-1102N are homogenous cores executing a common instruction set architecture. In at least one embodiment, processor core(s) 1102A-1102N are heterogeneous in terms of instruction set architecture (ISA), where one or more of processor core(s) 1102A-1102N execute a common instruction set, while one or more other cores of processor core(s) 1102A-1102N executes a subset of a common instruction set or a different instruction set. In at least one embodiment, processor core(s) 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Inference and/or training logic 715 are used to perform inferencing and/or training operations associated with one or more embodiments. In at least one embodiment portions or all of inference and/or training logic 715 may be incorporated into processor 1100. For example, in at least one embodiment, training and/or inferencing techniques described herein may use one or more of ALUs embodied in graphics processor 1108, processor core(s) 1102A-1102N, or other components in FIG. 11. In at least one embodiment, weight parameters may be stored in on-chip or off-chip memory and/or registers (shown or not shown) that configure ALUs of graphics processor 1100/1108 to perform one or more machine learning algorithms, neural network architectures, use cases, or training techniques described herein.

Embodiments presented herein can allow for a load balancer with one or more features for balance traffic within queueing systems.

Various embodiments can be described by the following clauses:

1. A processor, comprising one or more circuits to:
   map individual weights of a plurality of parallel links to a plurality of bit strings; transform the plurality of bit strings into a plurality of sparse bit strings;
   cause a vector to be generated representing bits interleaved sequentially from the plurality of sparse bit strings; and schedule, based at least in part on the vector, assignments for the plurality of parallel links.

2. The processor of clause 1, wherein the one or more circuits are further to:
   determine, based at least in part on the assignments to be scheduled, the individual weights of the plurality of parallel links.

3. The processor of clause 1, wherein a combined number of bits having a shared value of individual bit strings of the plurality of bit strings equal the individual weights of the individual bit strings, the shared value being assigned to indicate the weight.

4. The processor of clause 1, wherein the one or more circuits are further to:
   identify two or more available links connecting a scheduled origin and two or more intermediary as the plurality of parallel links.

5. The processor of clause 4, wherein the two or more intermediary comprise any two nodes connected to the scheduled origin node by parallel links.

6. The processor of clause 1, wherein the vector is generated using a pre-configured mapping function.

7. The processor of clause 6, wherein the pre-configured mapping function comprises a randomizer or linear-feedback shift register (LFSR) machine.

8. The processor of clause 1, wherein the one or more circuits are further to:
   determine a plurality of ports of the plurality of parallel links having more capacity than at least one other port; and send the scheduled assignments using the plurality of ports.

9. The processor of clause 1, wherein the plurality of parallel links are configured to be scheduled assignments according to a weighted round-robin schedule.

10. The processor of clause 1, wherein the assignments comprise one or more packets to be scheduled from at least one switch connected to the plurality of parallel links.

11. A method, comprising:
   mapping individual weights of a plurality of parallel links to a plurality of bit strings;
   transforming the plurality of bit strings into a plurality of sparse bit strings;
   generating a vector representing bits interleaved sequentially from the plurality of sparse bit strings; and
   scheduling, based at least in part on the vector, assignments for the plurality of parallel links.

12. The method of clause 11, further comprising:
   determining, based at least in part on the assignments to be scheduled, the individual weights of the plurality of parallel links.

13. The method of clause 110, wherein a combined number of bits having a shared value of individual bit strings of the plurality of bit strings equal the individual weights of the individual bit strings, the shared value being assigned to indicate the weight.

14. The method of clause 11, further comprising:
   identify two or more available links connecting a scheduled origin and two or more intermediary as the plurality of parallel links.

15. The method of clause 11, further comprising:
    determining a plurality of ports of the plurality of parallel links having more capacity than at least one other port; and
    sending the scheduled assignments using the plurality of ports.
16. The method of clause 11, wherein the plurality of parallel links are configured to be scheduled assignments according to a weighted round-robin schedule.
17. A system, comprising:
    one or more processors to queue traffic for a plurality of parallel links by, at least in part, representing a weight of the plurality of parallel links as a plurality of bit strings, wherein the plurality of bit strings are converted to a plurality of sparse bit strings, the plurality of sparse bit strings to be used to generate a representative vector of sequentially interleaved bits of the plurality of sparse bit strings, the traffic for the plurality of parallel links to be queued according to the representative vector.
18. The system of clause 17, wherein a combined number of bits having a shared value of individual bit strings of the plurality of bit strings equal the individual weights of the individual bit strings, the shared value being assigned to indicate the weight.
19. The system of clause 17, wherein the plurality of bit strings are converted using thermometer coding.
20. The method of clause 17, wherein the plurality of parallel links are queued traffic using a weighted round-robin scheduler.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising one or more circuits to:
   map individual weights of a plurality of parallel links to a plurality of bit strings;
   transform the plurality of bit strings into a plurality of sparse bit strings;
   cause a vector to be generated representing bits interleaved sequentially from the plurality of sparse bit strings; and
   schedule, based at least in part on the vector, assignments for the plurality of parallel links.

2. The processor of claim 1, wherein the one or more circuits are further to:
   determine, based at least in part on the assignments to be scheduled, the individual weights of the plurality of parallel links.

3. The processor of claim 1, wherein a combined number of bits having a shared value of individual bit strings of the plurality of bit strings equal the individual weights of the individual bit strings, the shared value being assigned to indicate the weight.

4. The processor of claim 1, wherein the one or more circuits are further to:
   identify two or more available links connecting a scheduled origin and two or more intermediary as the plurality of parallel links.

5. The processor of claim 4, wherein the two or more intermediary comprise any two nodes connected to the scheduled origin node by parallel links.

6. The processor of claim 1, wherein the vector is generated using a pre-configured mapping function.

7. The processor of claim 6, wherein the pre-configured mapping function comprises a randomizer or linear-feedback shift register (LFSR) machine.

8. The processor of claim 1, wherein the one or more circuits are further to:
   determine a plurality of ports of the plurality of parallel links having more capacity than at least one other port; and
   send the scheduled assignments using the plurality of ports.

9. The processor of claim 1, wherein the plurality of parallel links are configured to be scheduled assignments according to a weighted round-robin schedule.

10. The processor of claim 1, wherein the assignments comprise one or more packets to be scheduled from at least one switch connected to the plurality of parallel links.

11. A method, comprising:
mapping individual weights of a plurality of parallel links to a plurality of bit strings;
transforming the plurality of bit strings into a plurality of sparse bit strings;
generating a vector representing bits interleaved sequentially from the plurality of sparse bit strings; and
scheduling, based at least in part on the vector, assignments for the plurality of parallel links.

12. The method of claim 11, further comprising:
determining, based at least in part on the assignments to be scheduled, the individual weights of the plurality of parallel links.

13. The method of claim 11, wherein a combined number of bits having a shared value of individual bit strings of the plurality of bit strings equal the individual weights of the individual bit strings, the shared value being assigned to indicate the weight.

14. The method of claim 11, further comprising:
identify two or more available links connecting a scheduled origin and two or more intermediary as the plurality of parallel links.

15. The method of claim 11, further comprising:
determining a plurality of ports of the plurality of parallel links having more capacity than at least one other port; and
sending the scheduled assignments using the plurality of ports.

16. The method of claim 11, wherein the plurality of parallel links are configured to be scheduled assignments according to a weighted round-robin schedule.

17. A system, comprising:
one or more processors to queue traffic for a plurality of parallel links by, at least in part, representing a weight of the plurality of parallel links as a plurality of bit strings, wherein the plurality of bit strings are converted to a plurality of sparse bit strings, the plurality of sparse bit strings to be used to generate a representative vector of sequentially interleaved bits of the plurality of sparse bit strings, the traffic for the plurality of parallel links to be queued according to the representative vector.

18. The system of claim 17, wherein a combined number of bits having a shared value of individual bit strings of the plurality of bit strings equal the individual weights of the individual bit strings, the shared value being assigned to indicate the weight.

19. The system of claim 17, wherein the plurality of bit strings are converted using thermometer coding.

20. The method of claim 17, wherein the plurality of parallel links are queued traffic using a weighted round-robin scheduler.

* * * * *